United States Patent [19]

Hayashi et al.

[11] 4,333,897
[45] Jun. 8, 1982

[54] METHOD AND MOLD FOR MOLDING PREFOAMED PARTICULATE THERMOPLASTIC SYNTHETIC RESIN MATERIAL

[75] Inventors: Tatsuo Hayashi, Nakatsugawa; Ryouichi Itoh, Yokkaichi; Tatsumi Tsuji, Suzuka, all of Japan

[73] Assignees: Mitsubishi Petrochemical Company Limited, Tokyo; Daisen Industry Company Limited, Saitana, both of Japan

[21] Appl. No.: 57,569

[22] Filed: Jul. 16, 1979

[30] Foreign Application Priority Data

Jul. 18, 1978 [JP] Japan ................................. 53-86684

[51] Int. Cl.$^3$ ............................................. B29D 27/00
[52] U.S. Cl. ...................................... 264/40.6; 249/79; 264/45.5; 264/51; 425/4 R; 425/144
[58] Field of Search .................. 425/4 R, 384, 817 R, 425/144; 264/45.5, 53, 51, 48, 45.5, 40.6; 249/79

[56] References Cited

U.S. PATENT DOCUMENTS

| | | | |
|---|---|---|---|
| 2,898,632 | 8/1959 | Irwin et al. | 264/48 |
| 3,170,010 | 2/1965 | Schultz et al. | 264/51 |
| 3,224,037 | 12/1965 | Robbins et al. | 264/51 X |
| 3,225,126 | 12/1965 | Bridges et al. | 264/51 |
| 3,235,908 | 2/1966 | Thompson | 425/4 R |
| 3,235,908 | 2/1966 | Thompson | 264/51 X |
| 3,236,927 | 2/1966 | Thompson | 264/51 |
| 3,278,658 | 10/1966 | Immel | 264/51 |
| 3,417,173 | 12/1968 | Harrison | 264/51 X |
| 3,424,827 | 1/1969 | Galizia et al. | 264/51 |
| 3,534,128 | 10/1970 | Makowski | 425/4 R |
| 3,792,137 | 2/1974 | Seto | 425/817 R |
| 3,801,244 | 4/1974 | Eisenberg | 425/817 R |
| 3,837,769 | 9/1974 | Erlenbach | 425/4 R |
| 3,874,830 | 4/1975 | Carter et al. | 425/4 R |
| 3,897,201 | 7/1975 | Belot et al. | 264/53 X |

FOREIGN PATENT DOCUMENTS 53-11994 4/1978 Japan .

Primary Examiner—Philip Anderson

[57] ABSTRACT

This invention relates to a mold for molding prefoamed material of thermoplastic synthetic resin, in which the foamed product is provided with a smoothened superficial skin layer on the overall surface thereof, a beautiful external appearance and a remarkable strength. The mold according to this invention consists of a pair of molds each of which is provided with an internal wall facing to a cavity and an external wall not facing to the cavity, and either one of or each of which is provided with at least one heating chamber including a steam inlet and a steam outlet both of which are mounted in the external wall. And either one of or each of the two molds is provided with a plurality of steam passages and a surface-heating chamber independent thereof both of which are mounted in the internal wall.

6 Claims, 6 Drawing Figures

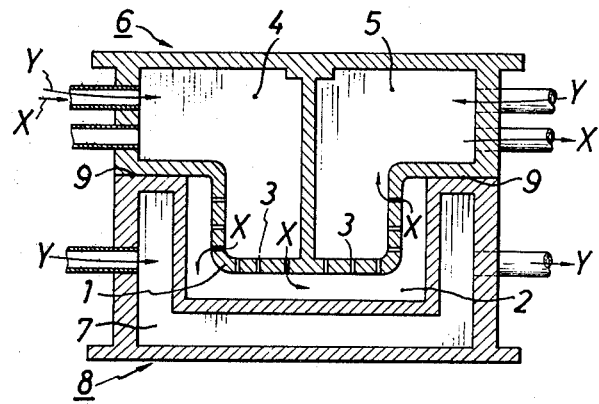
Fig. 1
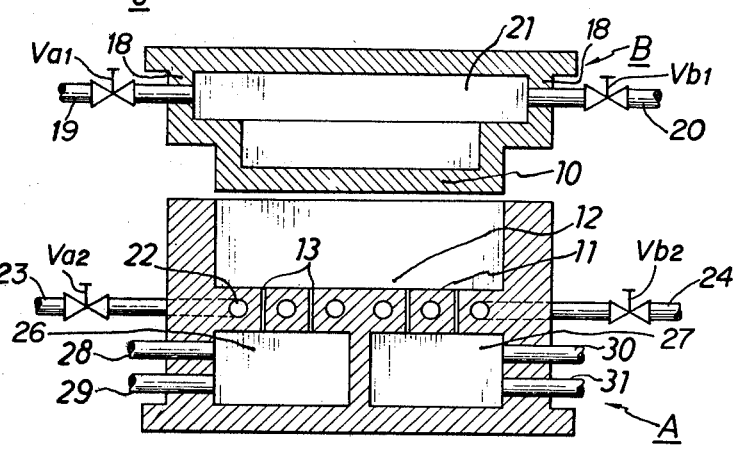
Fig. 4
Fig. 5
Fig. 6
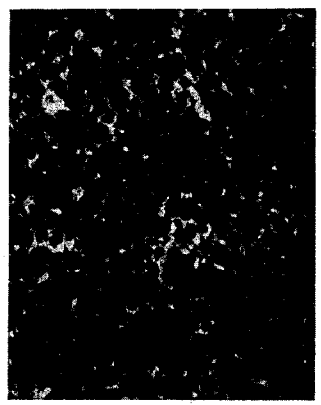

METHOD AND MOLD FOR MOLDING PREFOAMED PARTICULATE THERMOPLASTIC SYNTHETIC RESIN MATERIAL

BACKGROUND OF THE INVENTION

This invention relates to a mold for molding prefoamed material of thermoplastic synthetic resin.

The inventors of this application has already proposed this kind of mold in the Japanese Patent Publication No. 53-11994 (Published in 1978). As shown in FIG. 1, the mold of the above Patent Publication comprises a male mold 6 and a female mold 8, in which the former includes two heating and cooling chambers 4, 5 provided with a plurality of steam passages 3 within an internal wall 1 contacting foamed material of synthetic resin introduced in a cavity 2, while the latter includes a heating and cooling chamber 7.

When using the above mold, polyolefin particles foamed previously in other place are filled in the mold. At the first stage of heating, a steam is guided as shown by arrow X, and flows into firstly the chamber 4 of the male mold 6, the steam passages 3, the cavity 2, again the steam passages 3 and finally the chamber 5. Under the next heating, the steam is passed through the chamber 7, 4, 5 from an arrow Y, the polyolefin foamed particles being melted, and finally a preferred shape being formed.

However, this kind of mold has the following disadvantages and inconveniences.

(1) Since the female mold 8 including the chamber 7 makes it possible to adjust the steam pressure and raise the temperature to a necessary degree, the temperature of the previously foamed particles contacting the female mold 8 is much higher than that of the foamed particles in the midst of the cavity, so that a superficial skin layer is formed beautifully. However, in case of the male mold 6, at the beginning of heating, the steam introduced into the cavity 2 from the passages 3 escapes outside the mold through a parting line 9 between the two molds, 6, 8. As a result, the steam pressure is decreased and the heating and melting are going on with the low temperature steam. For this reason, a desired superficial skin layer is not formed on the portion contacting the male mold 6. In addition, there often remain some traces of bead interfaces on a surface of the foamed product. This is undesirable in view of external appearance. Moreover, the strength of the bead interfaces is weaker than that of the portion of the superficial layer, consequently the strength of the foamed product as a final product being not uniform. Further, in case of crystalline thermoplastic resin like polyolefin, a superficial layer of the foamed material may be affected seriously by a slight difference of the molding temperature.

(2) When increasing the steam pressure for raising the temperature of the male mold 6 having the steam passages 3 in order to eliminate the aforementioned temperature difference, there is the danger that the foamed material adjacent the steam passages 3 is worsened because holes are made on the surface of said foamed material.

(3) It is necessary to make the heating time longer.

The present invention aims at removing the above disadvantages of the conventional mold for molding prefoamed material of thermoplastic synthetic resin.

SUMMARY OF THE INVENTION

Accordingly, it is an object of this invention to provide a mold for molding prefoamed material of thermoplastic synthetic resin, in which the foamed product is provided with a smoothened superficial skin layer on the overall surface thereof, a beautiful external appearance and a remarkable strength.

It is another object of this invention to provide a mold for molding prefoamed material of thermoplastic synthetic resin, in which the thickness of the superficial skin layer on the foamed product can be adjusted.

It is a further object of this invention to provide a mold for molding prefoamed material of thermoplastic synthetic resin, in which the molding cycle of the foamed material is shortened, and a molding time of the prefoamed material can be reduced remarkably.

Speaking more in detail, the mold according to this invention comprises a pair of molds, each one being provided with an internal wall facing to a cavity and an external wall not facing to the cavity. Further, either one of or each of the two molds is provided with at least one heating chamber including a steam inlet and a steam outlet both of which are mounted in the external wall. Further, either one of or each of the two molds is provided with a plurality of steam passages and a heating chamber independent thereof both of which are mounted in the internal wall. Thus, the foregoing structure makes it possible to control the temperature of the internal wall independent of that of the foamed material and in accordance with the foaming progress.

Other and further objects, features and advantages of this invention will appear more fully from the following description.

BRIEF DESCRIPTION OF THE ACCOMPANYING DRAWINGS

FIG. 1 is a longitudinal section view of a conventional mold for molding prefoamed material of thermoplastic synthetic resin.

FIG. 4 is a longitudinal section view of another embodiment of this invention.

FIG. 5 is a view of an external surface of the foamed product obtained by the invented mold for molding prefoamed material of thermoplastic syntehtic resin.

FIG. 6 is a view of an external surface of the foamed product obtained by the conventional mold.

DETAILED DESCRIPTION OF PREFERRED EMBODIMENTS

Figure 2:
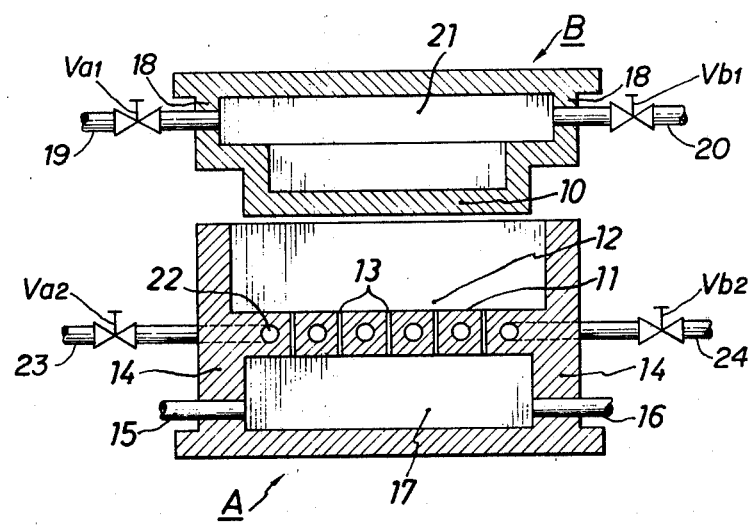
FIG. 2 is a longitudinal section view of an embodiment of a mold for molding prefoamed material of thermoplastic synthetic resin according to this invention.

Preferred embodiments of this invention will be described in conjunction with FIGS. 2, 3, 4.

A mold according to this invention comprises a female mold A and a male mold B. Referring first to the female mold A, a plurality of steam passages 13 are formed in an internal wall 11 contacting a polyolefin prefoamed material for molding, in other words, in the internal wall 11 facing to a cavity 12. Within the external wall 14 which does not face to the cavity 12 there is formed a chamber 17 for both heating and cooling having a supply port (inlet) 15 of and an exhaust port (outlet) 16 of steam and cooling water. Thus, a female mold A includes the chamber 17, while a male mold B includes a chamber 21 for both heating and cooling. The chamber 21 has a supply port (inlet) 19 and an exhaust port (outlet) 20 of steam and cooling water, both of which are respectively formed in both external walls 18 which do not face to the cavity 12. On other other hand, there is formed a zigzag-type chamber 22 in the internal wall 11 of the female mold A. This is independent of the plurality of steam passages 13 as well as of the chamber 17 communicating therewith. The zigzag-type chamber 22 is made of a long and slender channel having a supply port (inlet) 23 of and an exhaust port (outlet) 24 of both steam and cooling water, and is disposed in a zigzag form among a plurality of steam passages 13 so as to carry out an effective heating and cooling over the superficial area of the preformed material in the cavity 12. A plurality of steam passages 13 are distributed and spaced regularly so as to be able to form the zigzag-type channel 22 inside the internal wall 11.

Figure 3:
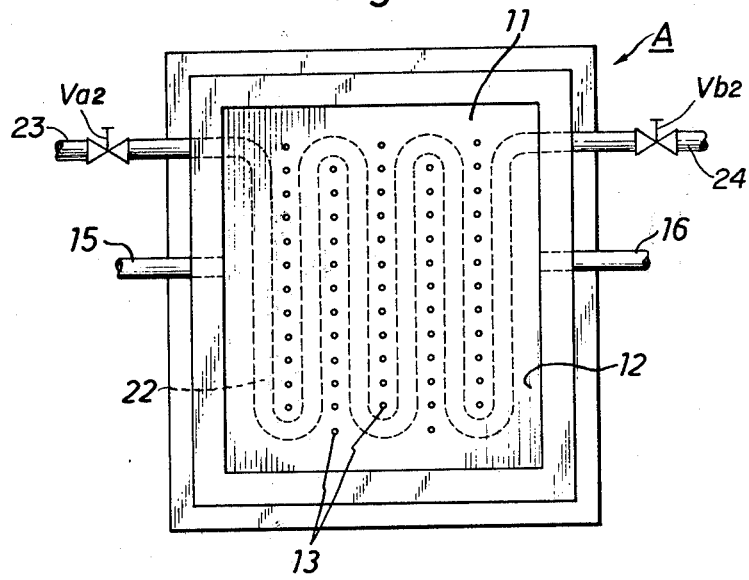
FIG. 3 is a plan view of a female mold in the above embodiment.

An embodiment of FIG. 4 consists of two chambers 26, 27 by dividing the chamber 17 of FIG. 2 into two. Numerals 28, 30 are inlets of steam and cooling water, while numerals 29, 31 are outlets thereof. Further, a plurality of steam passages 13 and an independent zigzag-type channel (not illustrated in FIG. 4) can be mounted inside the internal wall 10 of the male mold B. Alternatively, unlike the embodiment of FIG. 2, a plurality of steam passages 13 and the zigzag-type channel 22 can be mounted in the male mold B. Alternatively, the chamber 21 of the male chamber B can be divided into two.

Further, the steam pressure can be adjusted by installing steam pressure reducing valves Va1, Va2 at the end of the steam inlets 19, 23 respectively for the superficial heating of the material and drain valves Vb1, Vb2 at the end of the steam outlets 20, 24 respectively. The drain valve exhausts only drain caused by steam condense while maintaining the steam pressure in the zigzag-type channel 22 and the chamber 21 to a preferred setting pressure by the pressure reducing valve.

The use and function of the present invention will be described with reference to FIG. 2.

The raw material for this invention is of prefoamed particles of polyolefin, each of which is normally less than 0.2 cc at an average capacity, 1~1.5 mm at length and less than 0.5 mm at a foam size. It is obtained by the process that polyolefin, foaming agent, assistant, nucleating agent, pigment and the like are all mixed and melted over the melting point of polymer and over the decomposition temperature, then excluded and solidified. The foamed product obtained thus is cut into small pieces i.e. particles each having the capacity less than 0.2 cc and the length of 1–1.5 mm.

As polyolefin, there is usable either one or a mixture of two or more substances out of high-density or medium-density or low-density polyethylene, ethylenevinyl acetate copolymer, ethylene-acryle ester copolymer, ethylene-propylene copolymer, polypropylene and polybuten-1 and the like. Further, either one of the above substances or the mixture of two or more substances can be added to buthyl rubber, ethylene-propylene rubber, styrenbutadiene copolymer, polyisobutylene, polystyrene and/or ABS resin. Thus, various kinds of mixtures are obtained.

As the foaming agent, either one of the following substances or a mixture of two or more substances is usable: azodicarbonamide, dinitrospentamethyltetramine, benzene sulfonyl hydrazide, toluene sulfonyl hydrazide, 4,4'-oxybisbenzene sulfonylhydrazide, diphenylsulfone-3,3'-disulfonylhydrazide, barium azodicarboxylate, trihydrazinotriazine, 4,4'-oxybisbenzene sulfonylsemicarbazide, toluensulfonylsemicarbazide, sodium bicarbonate or the like. Under the heating, it is required that each of them is decomposed and then causes gas. If necessary, as the assistant for adjusting the decomposition temperature of foamed agent and as the nucleating agent for adjusting the foam cell, for instance, zinc oxide, calcium carbonate, magnesium oxide, zinc stearate, magnesium stearate and the like are usable. Further, a pigment for coloring or an addition agent for preventing oxidation may be added.

The polyolefin prefoamed particles obtained thus are excessively filled into the female mold A so that their amount may be filled 120 to 200% as much as the capacity of the cavity 12. Next to this, the steam having a higher temperature than the polyolefin melting point is fed into the zigzag-type channel 22 and the chamber 21 from the respective inlets 23, 19, and both the molds A, B are preheated. Also, the polyolefin perfoamed particles are preheated. While continuing the primary preheating, the secondary preheating is carried out by supplying the steam at a higher temperature than the polyolefin melting point from the inlet 15 into the chamber 17. Then, the steam having passed through the passages 13 are passed through gaps between the polyolefin foamed particles which have been filled, and exhausted to the outer atmosphere, so that the foamed particles are placed in a melting condition within a very short time.

Due to the primary and secondary preheating, the temperature of the polyolefin foamed particles adjacent the surface of the female mold A and the male mold B becomes higher than that of the polyolefin particles in the midst of the cavity, and reaches over the polyolefin melting point. Then, a pair of two molds A, B are clamped by moving the male mold B toward the female mold A. A melting layer of the polyolefin prefoamed particles of a higher temperature than the polyolefin melting point flows laterally. Or, the foamed cell may be destroyed, deformed or moved. Consequently, a melted layer i.e. a superficial layer begins to be formed. At the time, the expansion force of the polyolefin prefoamed particles occurs due to a thermal expansion of air between gaps of the prefoamed particles and of the air within the cell, and functions as pressure to the internal wall of the mold forming the cavity 12. Thus, it helps to form a good superficial layer by making good the shapeness.

After the mold clamping, while continuing the preheating process, the superficial temperature of the mold is to be heated formally while keeping the temperature of over 5° C. higher than the polyolefin melting point. Due to the above formal heating, the superficial layer of the polyolefin foamed material is completely melted and smoothened beautifully.

After that, a cooling water is supplied into the respective chambers 17, 21 and the zigzag-type channel 22 from the inlets 15, 19 and 23 respectively, and exhausted from the outlets 16, 20 and 24. Thus, both the male mold A and the female mold B are cooled. After that, the two molds are opened and the solidified polyolefin foamed product is taken therefrom by a releasing pin.

Further, the use and function of the mold according to this invention will be described in connection with preferred examples.

EXAMPLE

The raw material for use is to extrude with a φ65 mm extruder the blend which has blended with a V-type blender azodicarbonamide 0.5 parts by weight and pigment 0.5 parts by weight as foaming agent in relation to high-density polyethylene pellets 100 parts by weight, more than the temperature (dies temperature 200° C.) at which the azodicarbonamide is decomposed. Then, the extruded material was cut into numerous prefoamed particles each having the length of 2.0±1.0 mm and the apparent density 0.320 g/cc.

The prefoamed particles were excessively filled in the cavity 12 of the female mold A shown in FIG. 2 so that their quantity may be 155% of the capacity of the cavity 12. Next to this, the primary preheating was carried out by supplying steam of 4 kg/cm$^2$ for 15 seconds into the chamber 21 of the male mold B and the zigzag-type channel 22 of the female mold A. At that time, the superficial temperature of the material facing to the cavity 12 between the two molds A, B was 148° C. While continuing the primary heating, the secondary heating was carried out by supplying steam of 4 Kg/cm$^2$ for 15 seconds into the chamber 17 of the female mold A. Thus, the prefoamed particles were melted completely within the female mold A. Subsequently, by moving the male mold B forward by 5.5 mm, the formal heating was carried out by supplying steam of 4 Kg/cm$^2$ for 5 seconds into the chambers 17, 21 and the zigzag-type channel 22. After that, cooling water was supplied into the chambers 17, 21 and the zigzag-type channel 22, whereby the melted material was solidified for 90 seconds. By separating the two molds A, B, for each other the foamed product was taken out.

The foamed product obtained thus was one having a diameter of thickness 10 mm × width 600 mm × length 600 mm and a density of 0.55 g/cc, of which overall surface had gloss without any flash marks, weld marks or the like. Its external appearance was very beautiful. FIG. 5 is a view of a good external surface of the foamed product obtained by this example.

In order to compare with this example, we will describe another example having the steam passages within the two molds, but having no zigzag chamber 22.

COMPARISON

As the raw material there were used the prefoamed particles of which apparent density is 0.320 g/cc. The prefoamed particles were excessively filled in the cavity of the female mold shown in FIG. 1 so that their quantity may be 165% of the cavity capacity. Next to this, steam of 4 Kg/cm$^2$ was supplied for 30 seconds into the chamber of the female mold, and the material was melted. Subsequently, the male mold was moved by 6.5 mm toward the female mold. At that time, the superficial temperature of the male mold was 125° C. Further, steam of 4 Kg/cm$^2$ was supplied for 40 seconds into the chambers of the male and female molds, and then cooling water was supplied for 90 seconds into the above chambers. Thus, by opening the two molds, a foamed product was obtained.

The foamed product obtained thus has the granular-like superficial layer facing the male mold, dimension of 10 mm × 600 mm × 600 mm and the density of 0.55 g/cc. Its external appearance was bad. In FIG. 6 there is shown a view of a bad external surface of the foamed product obtained by this Comparison.

The features of this invention will be summarized as follows.

(1) Even if the mold comprises a plurality of steam passages, the heating is carried out by a zigzag-type chamber, so that at the heating time the steam pressure and the mold temperature are not decreased. Accordingly, there remains no trace of bead interface on the surface of the foamed material contacting the mold, and a smoothened superficial skin layer is formed.

(2) Unlike in the conventional mold (FIG. 1), there occurs substantially no time lag of the heated steam's passing through the foamed material. Accordingly, there exists no temperature difference on the mold surface. As a result, a superficial skin layer of the foamed product has a uniform thickness, smoothness and gloss.

(3) In the conventional mold (FIG. 1), there is the danger that some holes may be made on the foamed material adjacent a plurality of steam passages due to the raising of steam pressure. According to this invention, the steam heating can be carried out by the zigzag-type chamber, so that an excessive steam supply is not required.

(4) The molding cycle is shortened. The main reasons are as follow:

The steam pressure is not reduced due to the steam escape from a plurality of steam passages. In addition, all superficial areas of prefoamed material contacting with the wall of the cavity are effectively heated by the zigzag-type chamber. Further, the prefoamed particles of thermoplastic synthetic resin are firstly preheated, and then the steam is fed into the cavity. Accordingly, the preheating is used effectively. Since the steam feeding time becomes short, the drain amount which is condensed in the chamber is lesser.

(5) In addition, the steam for heating the surface of the prefoamed material is independent of that for feeding into the prefoamed material in the midst of the cavity. Accordingly, by adjusting the supply pressure of the former, it is possible to control the superficial temperature of the prefoamed material and adjust the thickness of the superficial layer.

(6) Accordingly, the molding time of the prefoamed material can be reduced remarkably.

As many apparently widely different embodiments of this invention may be made without departing from the spirit and scope thereof, it is to be understood that the invention is not limited to the specific embodiments thereof except as defined in the appended claims.

What is claimed is:

1. A method for molding prefoamed particles of thermoplastic synthetic resin in a mold comprising opposed mold parts defining when closed a cavity and each of which parts have internal and external walls facing and not facing, respectively, the cavity, one or both of the mold parts having a heating chamber with steam inlet and outlet on an external wall, and one or both of the mold parts having a plurality of uniformly distributed steam passages in its internal wall leading from the cavity to the heating chamber, said internal wall having a surface heating chamber independent of the steam passages, comprising the steps: introducing the prefoamed particles into the cavity, thereafter introducing steam into the heating chamber to cause steam to feed through the plurality of passages into gaps between the prefoamed particles filled in the cavity to preheat same, and following this preheating, the mold is closed and steam is introduced into the surface heating chamber to cause the prefoamed particles contacting the cavity walls to be heated to form a smoothed superficial skin layer on the surface of the molded material, and controlling the steam pressure introduced into the surface heating chamber in order to control over a continuous range the superficial temperature of the prefoamed material and thereby control over a continuous range the thickness of the superficial skin layer on the surface of the prefoamed material.

2. A mold for molding prefoamed particles of thermoplastic synthetic resin, comprising a pair of mold parts which when closed define a cavity for receiving the prefoamed particles and each of which has an internal wall facing to the cavity and an external wall not facing to the cavity, one or both of the mold parts having at least one heating chamber including a steam inlet and a steam outlet both of which are mounted in the external wall, one or both of the mold parts having a plurality of uniformly distributed steam passages in its internal wall for introducing steam from the adjacent heating chamber into the cavity, one or both of the mold parts having a surface-heating chamber mounted in its internal wall containing the steam passages and independent of the plurality of steam passages, first means for introducing pressurized steam into the heating chamber adjacent the steam passages, second means separate from the first means for introducing pressurized steam into the surface-heating chamber, said second means comprising a supply port provided with a steam pressure reducing valve connected to one end of the surface heating chamber for introducing continuously variable controlled pressurized steam into the surface heating chamber, and an exhaust port connected to the opposite end of the surface heating chamber and provided with further valve means to control the steam pressure in the surface heating chamber.

3. The mold as claimed in claim 2, wherein the surface-heating chamber is a tubular channel which is mounted in the internal wall facing to the cavity.

4. The mold as claimed in claim 3, wherein the surface-heating chamber has a zigzag form so as to enable heating all the area of the internal wall facing to the cavity.

5. The mold as claimed in claim 2, wherein the mold parts are adapted to move vertically when opening and closing, and the plurality of passages and the surface-heating chamber are independently mounted in the internal wall of the lower of the mold parts.

6. The mold as claimed in claim 2, wherein the mold parts are male and female, respectively, and the internal wall in which are mounted the plurality of steam passages and the surface-heating chamber independent thereof is formed in the female mold part.

* * * * *